(12) United States Patent
Schott et al.

(10) Patent No.: US 6,915,502 B2
(45) Date of Patent: Jul. 5, 2005

(54) SYSTEM LEVEL APPLICATIONS OF ADAPTIVE COMPUTING (SLAAC) TECHNOLOGY

(75) Inventors: Brian Schott, Gambrills, MD (US); Robert Parker, Oakton, VA (US)

(73) Assignee: University of Southern California, Los Angeles, CA (US)

( * ) Notice: Subject to any disclaimer, the term of this patent is extended or adjusted under 35 U.S.C. 154(b) by 292 days.

(21) Appl. No.: 10/038,063

(22) Filed: Jan. 3, 2002

(65) Prior Publication Data

US 2002/0112091 A1 Aug. 15, 2002

Related U.S. Application Data (60) Provisional application No. 60/259,635, filed on Jan. 3, 2001.

(51) Int. Cl.[7] ............................................. G06F 17/50
(52) U.S. Cl. ........................................ 716/16; 716/1
(58) Field of Search ........................ 716/1, 16–17; 709/251; 370/222–224, 258, 404–406, 452

(56) References Cited

U.S. PATENT DOCUMENTS

| | | | | |
|---|---|---|---|---|
| 5,663,721 A | * | 9/1997 | Rossi | 341/51 |
| 5,684,980 A | | 11/1997 | Casselman | 703/23 |
| 5,802,290 A | | 9/1998 | Casselman | 709/201 |
| 5,875,313 A | * | 2/1999 | Sescila et al. | 710/305 |
| 5,925,119 A | * | 7/1999 | Maroney | 710/315 |
| 6,023,755 A | | 2/2000 | Casselman | 712/37 |
| 6,173,333 B1 | * | 1/2001 | Jolitz et al. | 709/240 |
| 6,178,494 B1 | | 1/2001 | Casselman | 712/37 |
| 6,289,440 B1 | | 9/2001 | Casselman | 712/227 |
| 6,295,380 B1 | | 9/2001 | Takahashi | 382/240 |
| 6,393,557 B1 | | 5/2002 | Guthridge et al. | 713/1 |
| 2002/0152060 A1 | * | 10/2002 | Tseng | 703/17 |

* cited by examiner

Primary Examiner—Vuthe Siek
Assistant Examiner—Paul Dinh
(74) Attorney, Agent, or Firm—Fish & Richardson P.C.

(57) ABSTRACT

An API (Application Programming Interface) for an adaptive computing system (ACS) may be used to create a system for performing an application on different types of ACS platforms. The API may be used to generate a system object including a host and a number of nodes and channels. A system data structure is created which describes the nodes, which may be FPGA (Field Programmable Gate Array)-based ACS accelerator boards. The API may enable source-code porting and scaling from small research platforms to larger field-deployable platforms.

11 Claims, 5 Drawing Sheets

```
ACS_NODE nodes[4];    /* user structure to describe nodes */
ACS_CHANNEL channels[4];  /* user structure for channels */
ACS_STATUS status;    /*status of ACS API commands */
ACS_SYSTEM ring;

for (int i=0;i<4;i++) { /* build a ring of 4 WildForce boards */
    nodes[i].model = "WF4";
    channels[i].src_node = i;
    channels[i].src_port = 0;
    channels[i].dest_node=(i+1)%4;
    channels[i].dest_port=1;
}
ACS_Initialize(argc, argv, &status); /* must be first API call */
ACS_System_Create(&ring, nodes, 4, channels, 4);
/* user program that accesses "ring" object */
ACS_System_Destroy(ring);
ACS_Finalize();           /* must be last API call */
```

```
for (int i=0;i<4;i++) {
    /* send bitstream for each ACS board */
    ACS_Configure(config[i],i,ring,&status);
    ACS_Clock_Set(clock,i,ring,&status);/* set clock speed  */
    ACS_Run(i,ring,&status);             /* start clock       */
    ACS_Reset(i,ring,&status);           /* send reset signal */
}
for (int i=0;i<4;i++) {
    /* write initial data to each board's memory */
    ACS_Write(databuf[i],datalen[i],i,brd_addr[i],ring,&status);
    /* then send an interrupt (or inta) signal #1 to the baord */
    ACS_Interrupt(i,1,ring,&status);
}
```

```
/* use the ring to process the required number of images */
for (int i=0;i<NUM_IMAGES;i++) {
        /* send image onto channel associated with port 0*/
        ACS_Enqueue(image[i],IMAGESIZE,0,ring,&status);
        /* get resulting image from channel associated with port 1 */
        ACS_Dequeue(result_image[i],RESULT_SIZE,1,ring,&status);
}
```

SYSTEM LEVEL APPLICATIONS OF ADAPTIVE COMPUTING (SLAAC) TECHNOLOGY

CROSS-REFERENCE TO RELATED APPLICATIONS

This application claims priority to U.S. Provisional Application Ser. No. 60/259,635, filed on Jan. 3, 2001.

STATEMENT OF GOVERNMENT RIGHTS

This invention was made with government support under Contract No. F30602-97-2-0220 awarded by the Air Force. The government has certain rights in the invention.

BACKGROUND

An adaptive computing system (ACS) is a system that can reconfigure its logic and/or data paths in response to dynamic application requirements. The system may include a number of connected adaptive computing boards, each board including a reconfigurable FPGA (Field Programmable Gate Array) integrated circuit.

Applications to be performed by ACS systems may be developed and implemented on different platforms. For example, many ACS applications require strict VME (Versa Module Europa) environments found in large, embedded systems, yet much of the algorithm mapping may be done in university research labs using PCI (Peripheral Component Interconnect)-based systems.

Replicating these VME environments in university labs may be prohibitively expensive because of the cost of chassis, single-board computers, and real-time software development tools. In addition there is a learning curve associated with programming and debugging embedded systems that make them a poor choice for an application development platform for graduate students. Conversely, allowing the university partners to develop their applications on commercial ACS boards in a PC environment may also be impractical because no path exists to transition to the deployed environment. Accordingly, it may be desirable to provide an open, distributed, and scalable ACS system architecture that includes an API (Application Programming Interface) which enables source-code porting and scaling from small research platforms to larger field-deployable systems.

SUMMARY

An API (Application Programming Interface) for an adaptive computing system (ACS) may be used to create a system for performing an application on different types of ACS platforms. The API may be used to generate a system object including a host and a number of nodes and channels. A system data structure is created which describes the nodes, which may be FPGA (Field Programmable Gate Array)-based ACS accelerator boards. The API may enable source-code porting and scaling from small research platforms to larger field-deployable platforms.

DETAILED DESCRIPTION

Figure 1:
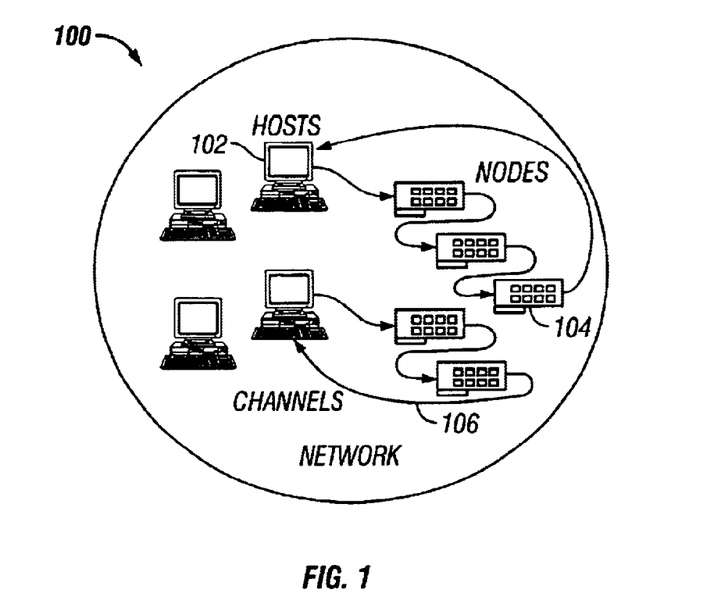
FIG. 1 is a block diagram a networked adaptive computing system (ACS) according to an embodiment.

FIG. 1 is a networked adaptive computing system (ACS) 100 according to an embodiment. The system may include a network cluster of heterogeneous FPGA (Field Programmable Gate Array)-accelerated nodes. As an ACS, the system may reconfigure its logic (FPGA nodes) and/or data paths in response to dynamic application requirements, such as requests and instructions received from a host or over the network.

The system may be based on an architecture which is open, distributed, and scalable. For example, the system shown in FIG. 1 may be implemented on a relatively small platform adapted for use in a university research environment, e.g., a cluster of personal computers (PCs) with PCI (Peripheral Component Interconnect)-based FPGA accelerators. Such a platform may provide a user-friendly environment for algorithm development and debugging. Alternatively, the system may be implemented on a larger embedded platform adapted for use in a field environment, e.g., a cluster of PowerPC™ nodes with VME (Versa Module Europa)-based FPGA accelerators and a commercial 6U-VME quad-PowerPC board serving as the carrier. Such a platform may provide the computational power necessary for certain computational intensive applications. In this system architecture, the two different platforms are source-code compatible. An API (Application Program Interface) enables applications developed on one platform to be readily ported to the other.

The system architecture view defines the system 100 as a collection of hosts 102, nodes 104, and channels 106. A host is an application process responsible for allocating nodes and setting up channels in the system. A host sends control commands over the network to nodes in the system. A node is a computational device such as an adaptive computing board. Nodes may be logically numbered during system creation. Channels are FIFO queues that interconnect nodes and hosts. Channels have endpoints, which are typically physical FIFOs on an adaptive computing board and buffer queues in a host process. The underlying runtime system is responsible for moving channel data across the network. From the application programmers perspective, channels are autonomous data streams.

Figure 2:
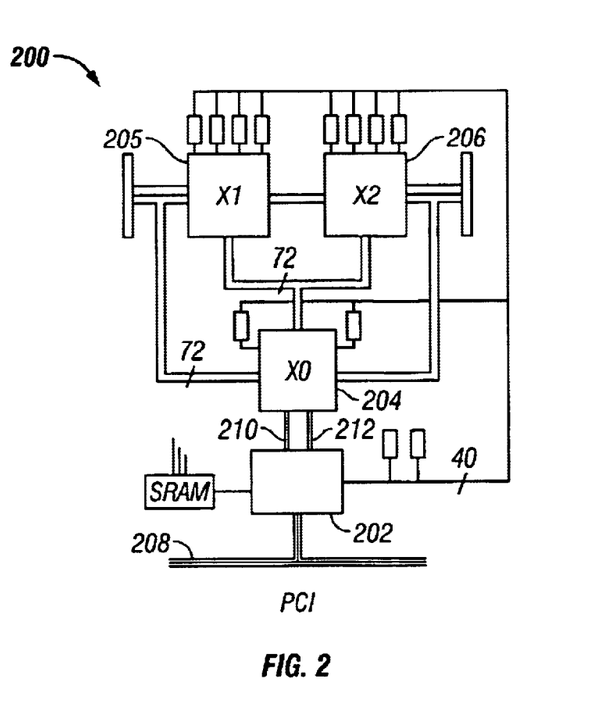
FIG. 2 is a block diagram of an ACS system hardware architecture according to an embodiment.

The hardware architecture for an ACS board 200 according to an embodiment includes a single interface FPGA 202 (labeled IF) and three user-programmable FPGAs 204–206 (labeled X0, X1, and X2), as shown in FIG. 2. The IF chip 202 may be configured at power-up to act as a stable bridge to the host system bus 208. The IF chip may provide configuration, chip, and control logic for the user FPGAs 204–206. The attached host is responsible for actually programming the user FPGAs and controlling the board. The architecture may support DMA (Direct Memory Access) to transport data to and from host memory. A clock generator and FIFOs implemented within the IF chip may enable the user FPGAs to operate at the optimal frequency for the application design.

Two bi-directional 72-bit "FIFO" connections 210, 212 between IF 202 and X0 204 permit the user FPGAs to produce and consume a 64-bit data word in a single clock cycle. The three user-programmable FPGAs are organized in a ring structure. X0 acts as the control element for managing user data flow, thus enabling the processing elements, X1 205 and X2 206, to focus on computation.

The ring path (X0→X1→X2→X0) may also be 72 bits wide so that an 8-bit tag can be associated with each 64-bit data word. The individual pin directions on the ring connections may be user controlled. Alternatively, this architecture may support on 36-bit clockwise ring, and one 36-bit counterclockwise ring. The "crossbar" connecting X0, X1, and X2 is a common 72-bit bus. The user controls the direction of individual pins of this crossbar. Six additional handshake lines (two each from X0 to X1, from X1 to X2, and from X0 to X2) may be used to permit crossbar arbitration without requiring unique configurations in X1 and X2.

The processing elements, X1 205 and X2 206, may each include an FPGA (e.g., a Xilinx XC40150XV-09) and four 256 K×18bit synchronous SRAMs. The Xilinx 40150 includes a 72×72 array of configurable logic block (CLBs) for 300 K equivalent logic gates supporting clock speeds up to 100 MHz. The SRAMs feature zero-bus turnaround permitting a read or write every cycle. No idle cycles are required for write after read with the only tradeoff being that write data is pipelined one cycle. Each processing element has two 72-bit connections to left and right neighbors for systolic data and a 72-bit connection to the shared crossbar. Other connections may include four LED lines, two handshake lines connected to X0, two handshake lines connected to IF, and two handshake lines connected to the neighboring processing element.

The control element 204, X0, may include an FPGA (e.g., a Xilinx XC408SXLA-09) and two 256 K×18 bit synchronous SRAMs. The Xilinx 4085 contains a 56×56 array of CLBs for a 55 K to 180 K equivalent gates at clock rates up to 100 MHz. X0 has two 72-bit ring connections, a 72-bit shared crossbar connection, and two 72-bit FIFO connections to the IF chip 202. The control element 204 acts as the data stream manager for the architecture. The location of the memories and major connections in X0 are designed to allow the device to be split into a pre-processing section on the left, and a post processing section on the right half of the FPGA.

The primary mission of the control elements is to read/write data from the FIFO module blocks implemented in the IF chip and pass this data on to the processing elements. The system itself may not be globally synchronous. The FPGA chips in the ring may be synchronous with each other, but synchronization with the network may depend on the data flow. The control element controls the data flow between the asynchronous part (i.e., the network fabric) and the synchronous part (i.e., the ring). Thus, the control element acts as the (co-located) endpoints of the chain of FPGAs.

The IF chip 202 may include an FPGA (e.g., a Xilinx XC4062XLA-09) and several supporting components for clock generation and distribution, configuration, power management, external memory access, and system bus interfacing. The clock generator may be tunable from 391 kHz to 100 MHz in increments less than 1 MHz. Clock distribution is separated into two domains. A processor clock (PCLK) drives the logic in X0, X1, and X2. PCLK is looped through the interface FPGA to support flexible countdown timers and single-step clocking. A memory clock (MCLK) drives the user memories and allows the host to access the memories while the PCLK is halted.

All of the user programmable memories in the architecture may be accessible from the host processor through an external memory bus 208. This feature guarantees a stable path to the memories for initialization, debugging, and retrieving results without depending upon the state of the user FPGAs. For each memory, a pair of transceivers isolates the address/control and data lines from the shared external memory bus. The transceivers are controlled from the IF chip.

The IF chip 202 may be programmed on power-up by an EEPROM to provide a stable interface to the host. The EEPROM program pins are accessible to the host through a control/status register in the IF chip. This enables in-system updates of the interface through software. The user programmable FPGAs in the system are configured from the IF chip.

The control element 204 and processing elements 205, 206 may be programmed individually or in parallel. There are two additional memories on the external memory bus dedicated as configuration and readback cache. The host can quickly load the configuration cache and the configuration can occur autonomously in the IF chip, thus freeing up the host more quickly. An added benefit of placing the configuration memories on the external memory bus is that any or all of the user memories can be conscripted as configuration caches.

An integral part of rapid prototyping on reconfigurable architectures is the ability to debug a design on the hardware. The IF chip 202 may provide readback access to X0, X1, and X2 for debugging operations through a set of control/status registers. The user generates a readback trigger signal and readback data is stored in the configuration cache memory. Once readback is completed, the host can access the readback data from the configuration memory with directed memory reads.

Four input FIFOs and four output FIFOs may be implemented inside the IF chip. The input FIFO port on X0 may have 64 data, 4 tag, one empty flag, one read-enable, and two FIFO-select pins. The output FIFO port may include the same pins with the exception of a full flag instead of an empty flag and a write-enable instead of read-enable. The numbered FIFOs act as separate endpoints for ACS system channels. The user FPGA logic can simultaneously process a number of input and output streams and dynamically route data across multiple network channels on a cycle-by-cycle basis.

Power consumption by FPGAs is a function dominated by clock rate and bit toggle rate. Since the user logic in X0, X1, and X2 has the potential of drawing too much power from the PCI slot and this behavior is application dependent, the IF chip may include a power monitoring circuit. Once a threshold level has been triggered the microcontroller interrupts the IF chip. The IF chip may be able to halt the processor clock to stop the user FPGAs and interrupt the host.

Figure 3:
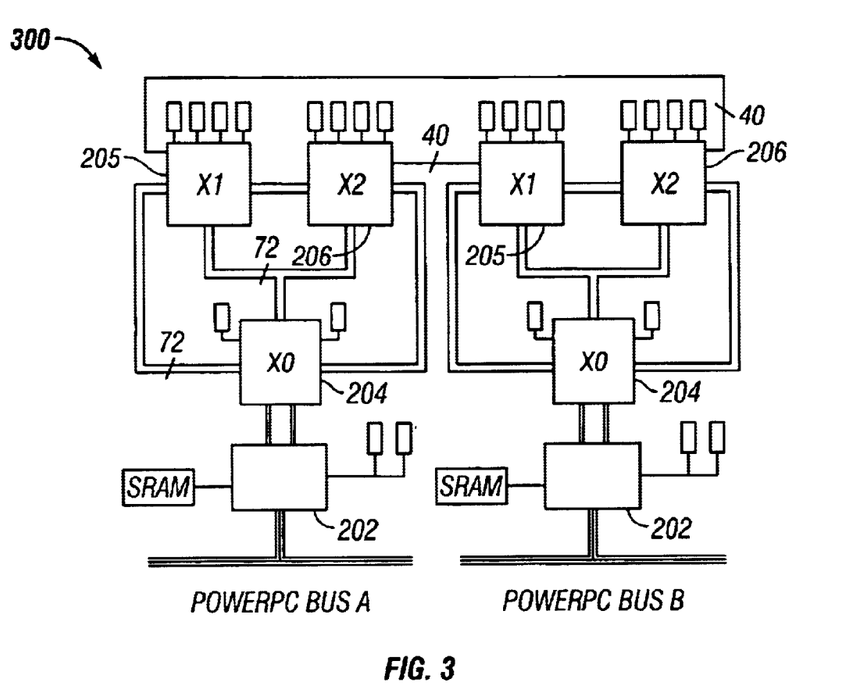
FIG. 3 is a block diagram of and ACS system hardware architecture according to an alternative embodiment.

The hardware architecture for an FPGA accelerator board 300 according to an alternate embodiment is shown in FIG. 3. The board includes two accelerators, node A and node B. This architecture may be used in an embedded system in a VME environment. The IF chip 202 may be a Xilinx 4085, which includes extra I/O pins which may be used to accommodate the non-multiplexed 64-bit PowerPC bus.

In an embodiment, a standard ACS API provides a developer with a single API for the control of a distributed system of adaptive computing boards, including the interconnection network. The API provides an integrated development environment for exploiting clusters and embedded systems. Applications developed on clusters using the API may be ported without source code modification to larger, embedded systems. The API provides the structure and communication for coarse-grain parallelism while controlling the adaptive computing boards that provide the fine-grain parallelism.

The primary model of coarse-grain parallelism supported by the API is a channel-based model. A channel is a single logical FIFO queue connecting two computational boards. The minimum system requirements assumed by the API are a host CPU running a modem OS and an ACS board with logical or physical FIFOs. The API may be based on a high level programming language, such as the C programming language.

The API is accessed from a program called the host program. The host program provides for control of the entire system. The programmer need only write one host program no matter how many boards are in the system. The host program can access several classes of API calls allowing functionality such as system management, memory access, streaming data, and board management. Additional functions to allow for concurrent operations on multiple boards are also part of the API. One of the design goals of the ACS API is provide a simple API for the control of a complex system.

The central component of the API is the specification and creation of a system object by the programmer. A system object is composed of nodes and channels. A node is a computational device, for example, an adaptive computing board. A channel is a logical FIFO queue between two nodes.

A user can construct an arbitrary system of channels and nodes. When creating a system, the user essentially selects boards from the architecture and chains their FIFOs together to approximate a monolithic device. The user is freed from the necessity of writing control programs on every computer to pass data manually because the API implementation controls the network and remote boards automatically after the channels are allocated. Furthermore, the API offers a consistent interface for both local and remote resources while preserving system performance.

The first task in a host program is the creation of the system object. The code fragment 400 in FIG. 4 may be used to construct the logical system 500 in FIG. 5. The program first creates two ACS data structures that describe the desired system object, in this case, a ring of four AMS WildForce™ FPGA-based adaptive computing boards 502–505, produced by Annapolis Micro Systems, Inc. of Annapolis, Md. After calling the API initialization routine, the program makes a single call to ACS_System_Create( ) to create the system. Following an arbitrary user program that may contain more API calls, routines are called to destroy the ring system object and shutdown the API.

Figure 4:
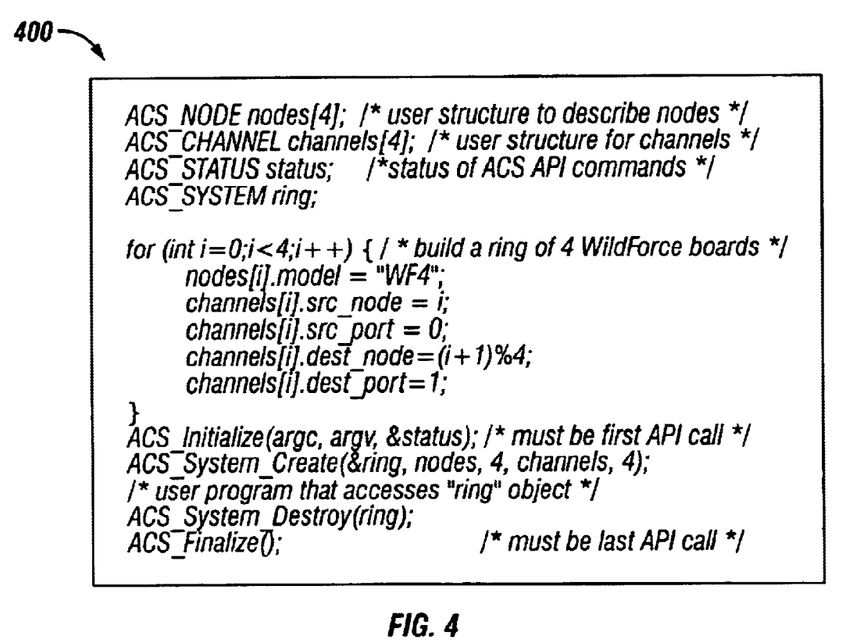
FIG. 4 is a code fragment for creating a ring system object according to an embodiment.
Figure 5:
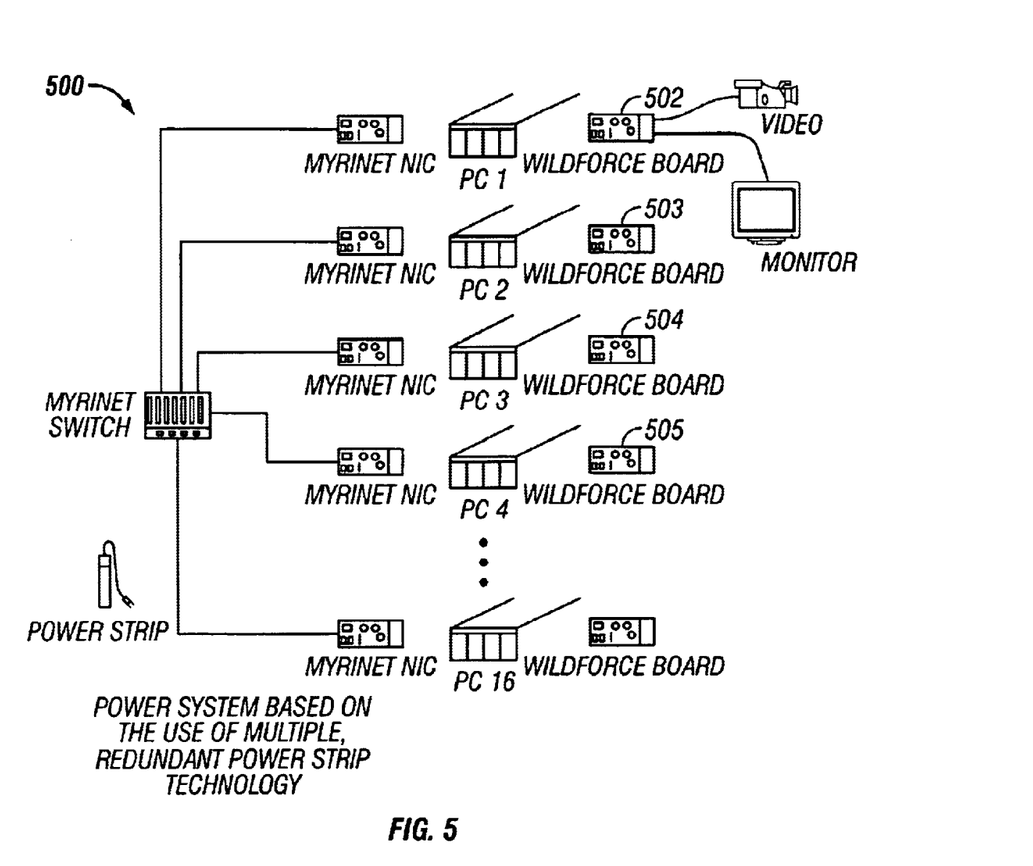
FIG. 5 is a block diagram of a logical system created using the code fragment of FIG. 4.

In addition to the static system creation illustrated in FIG. 4, the API may also include features for altering a system at runtime. Node and channels may be added or deleted after the creation of a system object through API calls. Multiple host processes may be also possible in the API.

Figure 6:
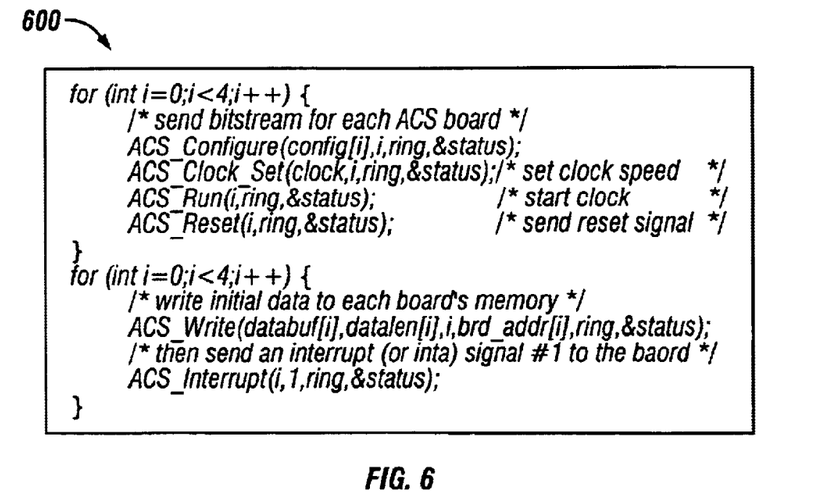
FIG. 6 is a code fragment for configuring and writing to an ACS board according to an embodiment.

Once the system object has been created, the boards can be configured and controlled via the API. The code fragment 600 in FIG. 6 sends a bitstream to each board as specified in a configuration data structure. This configuration data structure includes information on which processing elements to configure as well as board-level configuration information such as crossbar switch settings. After configuration, the code fragment sets the clock speed, starts the clock, and then sends a reset signal. Finally, the API provides calls for writing directly to the memory of a board. The second loop illustrates this call as well as the capability of sending interrupt signals of various types to each board. Also included for board management are routines to query the board, including functions for readback and querying the clock speed.

The API contains routines for read and write access to the memories of all boards, local and remote. The ACS_Read( ) command is used to get blocks of memory from a system, node, or address and places them into a user buffer. The ACS_Write( ) command is used to put blocks of memory from the user buffer into a system, node, or address Also included is a memory copy command, ACS_Copy( ), that causes a block of memory to be copied from one node to another node rather than using a read followed by a write. The ACS_Interrupt( ) command may be used to generate an interrupt signal at a node. These commands allow data to be sent outside of the channel-based system model. Although these commands put the burden of explicitly specifying all data movement solely on the developer, they can be quite useful for sending initialization data or retrieving accumulated data directly from boards, operations for which the channel model is not naturally suited.

Figure 7:
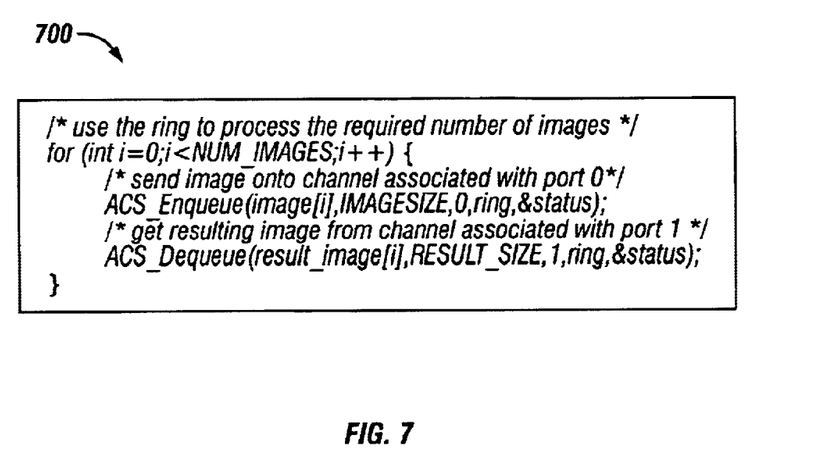
FIG. 7 is a code fragment demonstrating channel-based communication according to an embodiment.

The channel-based communication model requires the user to explicitly control only the initial entry and final exit of data from the system. Channel management functions enable the to hook endpoints together (e.g., physical FIFOs on boards) across network channels. Two primary commands, ACS_Enqueue( ) and ACS_Dequeue( ), are required to control communication. The ACS_Enqueue( ) command may be used to put data into a FIFO, and the ACS_Dequeue( ) command may be used to get user data from a FIFO. The use of these commands is illustrated in the ode fragment 700 shown in FIG. 7 where they control the data flow in the ring system that was created by the code fragment 400 in FIG. 4. The user can specify the behavior of each of the channels with additional API function calls, but is not required to do so. Such behavior can include the buffer size associated with a channel as well as the underlying communication mechanism.

The API may include a mechanism for issuing a set of non-blocking commands. The API functions described above may be blocking. For example, the ACS_Write( ) commands in FIG. 6 occur one after the other with the host program blocked during the execution of each write. Through the ACS_Request ( ) function, a user can specify a sequence of API functions to be executed as a set. This sequence is called a request and may include commands to read/write/copy memory, raise a reset line, or send an interrupt. Once a request has been created, it can be committed to execution using ACS_Commit( ). The ACS_Commit( ) function issues the commands, creates a handle, and returns control to the user. While those commands are executing, the user may perform other operations. Completion of the set of commands can be checked using ACS_Test, or can be waited upon in a blocking fashion using ACS_Wait( ). Once created, a request may be committed to execution multiple times. Benefits of the request mechanism include improved efficiency by overlapping user task execution with API task execution, combining multiple commands to reduce network overhead, and re-using command sequences to reduce API overhead.

The API also allows for certain commands to result in broadcasts of data rather than simple point-to-point transfers. By specifying ACS_ALL rather than an individual node number, the ACS_Configure( ) command can become a broadcast to all nodes, allowing for a single command to configure all the ACS boards in the system. The group management functions in the API can be used to specify groups of nodes in the system. Group identifiers can be used to transform broadcasts into multicasts.

The processing elements 205, 206 are able to observe reset lines and manipulate/observe interrupt lines. If memory is present, the processing elements can communicate with the host program by reading/writing that memory. The processing elements on a board (or a subset) can also read and write to a set of numbered (perhaps logical) FIFOs to support the channel-based communication model. An aspect of porting the API to any new board architecture is the provision of a FIFO mechanism. Such a mechanism can, for example, be provided by a combination of memory reads/writes and interrupts. It is the responsibility of the API implementation itself to manage a limited number of physical FIFOs.

Control of the system across multiple computers is accomplished by using a single process on every computer. The host program serves this purpose on the computer on which it runs. Other computers in the system run a control process. A control process is responsible for executing commands initiated by API calls, monitoring the local adaptive computing board, and communicating with other control processes. Each of the processes is multi-threaded to allow for concurrent communication and computation. Such multi-threading also allows the host process to execute the control process functions on the computer where the host process is running.

Two objects not directly viewed or manipulated by the user are the communication object and the world object. The communication object accomplishes all communication between processes on different computers. Different communication objects can be used to allow functionality in a heterogeneous network. The communication object may use MPI (Message Passing Interface) for communication, which is itself a standard API for communication between parallel processes.

The world object is used to encapsulate and maintain information about the computing environment in which the API is running. For example, the world object will contain a list of all the control processes and host processes running as well as how to communicate with those processes. The world object also contains a list of all the adaptive computing boards managed by each control process. The API may include a collection of routines to query the world object so that the user can dynamically create system objects based on which types of boards are available.

The core of the API implementation is written as operations on these objects. The classes associated with these objects, including virtual function definitions, are defined as part of the core implementation. By taking advantage of inheritance and encapsulation, the distinction between local and remote boards is easily hidden, and new types of boards and communication systems can be seamlessly included. For example, to extend the API to allow control of a new board, a developer just creates a class that inherits the node object and implements all of the virtual functions to allow for control of the new board, and the rest of the API implementation remains unchanged.

A potential pitfall in any interprocessor communication system is the introduction of multiple copies of large buffers, which may introduce unnecessary overhead into the implementation. The specific method for avoiding buffer copies, particularly ones implicit in calls to an underlying communication system, are specific to the type of communication object used. The API implementation, outside of the communication object, will not introduce extra copies of large buffers. Further savings in overhead can be accomplished by recognizing when commands or data are being sent to a local board as opposed to a board on a remote computer. Fortunately, the object-oriented implementation can accomplish this by simply providing a remote node object and a local node object that each inherit from the node object. Actions by the API may be performed on a node object without regard to local/remote considerations, but the correct node functions are called automatically depending on the whether the node is local or remote. This results in a logically simple implementation that introduces no unnecessary overhead for local operations.

Figure 8A:
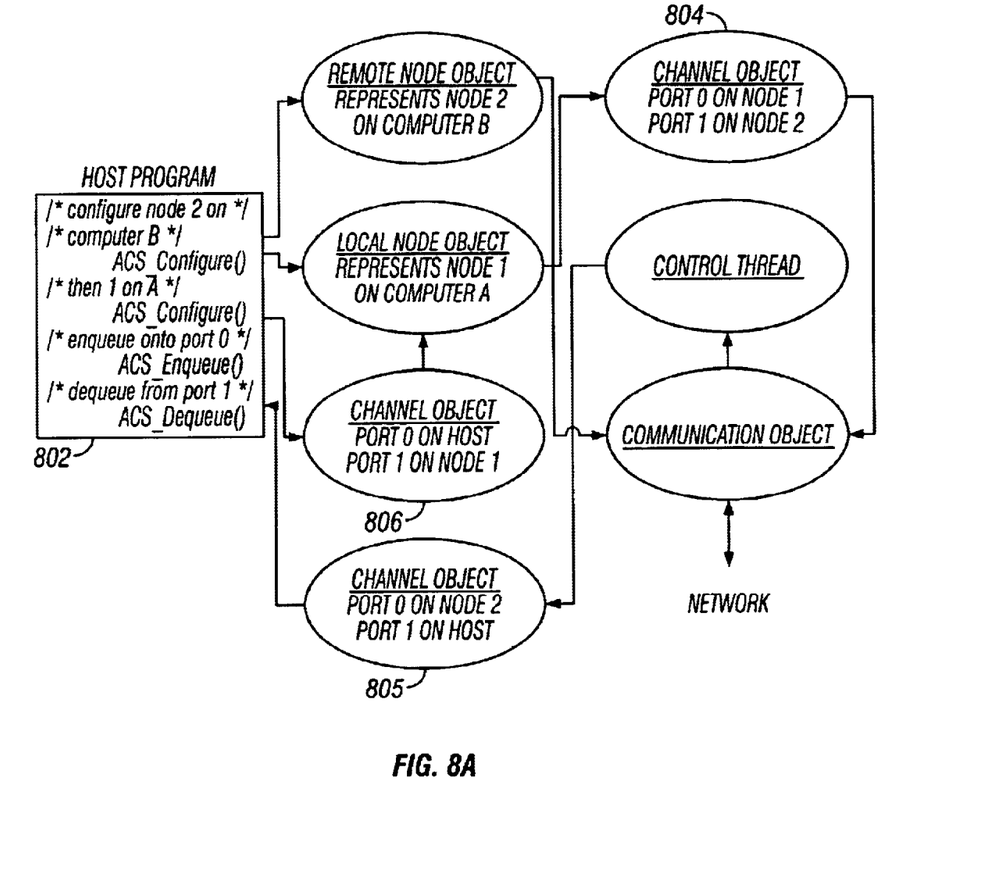
FIGS. 8A and 8B are block diagrams describing objects and threads on two computers in a system according to an embodiment.
Figure 8B:
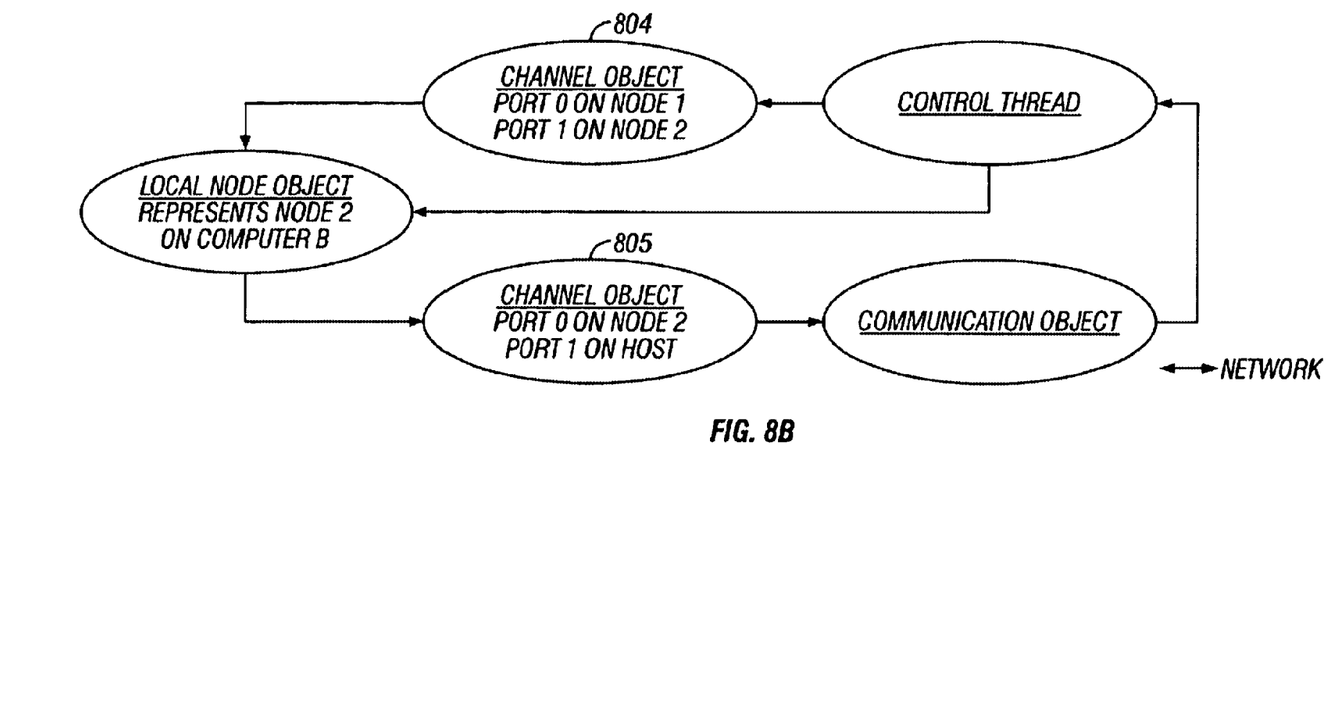

An illustration of the objects in the implementation and their interaction in a typical API operation is given in FIGS. 8A and 8B. The objects in this figure represent a host program 802 and node 1 executing on computer A and node 2 executing on Computer B. These objects are connected by three channels 804–806 to form a ring communication structure. FIG. 8A shows the objects and threads on computer A, and FIG. 8B shows the objects and threads on computer B. The example host program illustrates the basic communications that occur when the nodes are configured as well as the communications that occur when communications are initiated in the ring.

This conceptual ACS system view of hosts, nodes, and channels presents a programming model that may be advantageous for system developers. The notion of streaming data through an FPGA array using FIFOs is a familiar technique to ACS application designers. Chaining multiple ACS board designs together using channels is a fairly simple extension to this idea.

The ACS programming model also supports the alternate technique of reading and writing the on-board memories of FPGA boards for communication. A logical node number argument is added to read and write functions to access different boards in the system. Another advantage of the ACS programming model is that it encourages application designers to decompose their problem into multiple ACS board-size modules. These modules can be individually designed and tested in single ACS boards before being connected together with channels, thereby improving code modularity and reuse. This approach may also make it easier to exploit coarse-grained parallelism in an application. By replicating board-sized modules and distributing the compute load (such as distributing templates or partitioning images), an application can often scale to the number of ACS boards available in the system and gain a coarse-grained parallelism advantage.

A number of embodiments have been described. Nevertheless, it will be understood that various modifications may be made without departing from the spirit and scope of the invention. For example, the interface and control elements, IF and X0, may be merged to improve compute density. Accordingly, other embodiments are within the scope of the following claims.

What is claimed is:

1. Apparatus comprising:

a plurality of first adaptive computing elements connected in a first ring configuration, including a plurality of processing elements connected in a chain configuration and including a first processing element at a first end of the chain and a second processing element at a second end of the chain, and a control element connected to the first processing element and the second processing element, and operative to manage data entering the ring;

a bus; and an interface device connected between the control element and the bus, wherein each of the adaptive computing elements comprises a Field Programmable Gate Array integrated circuit, and wherein the ring includes two processing elements and wherein the apparatus further comprising a cross-bar data path connecting the control element to each of the two processing elements.

2. The apparatus of claim 1, wherein the bus comprises a PCI (Peripheral Component Interconnect) bus.

3. The apparatus of claim 1, wherein the bus comprises a VME (Versa Module Europa) bus.

4. The apparatus of claim 1, further comprising a host processor connected to the bus and operative to configure the adaptive computing elements.

5. The apparatus of claim 1, wherein the apparatus comprises an adaptive computing system (ACS) accelerator.

6. The apparatus of claim 1, further comprising a memory device connected to each of the processing elements.

7. The apparatus of claim 6, wherein each memory device comprises an SRAM (Static Random Access Memory).

8. The apparatus of claim 1, wherein the interface device is integrated in the control element.

9. The apparatus of claim 1, further comprising an integrated circuit including the processing elements and the control element.

10. The apparatus of claim 1, wherein the interfaces device comprises an FPGA (Field Programmable Gate Array) integrated circuit.

11. An Apparatus comprising:

a plurality of adaptive computing elements connected in a ring configuration, including a plurality of first processing elements connected in a chain configuration and including a first processing element at a first end of the chain and a second processing element at a second end of the chain; and a first control element connected to the first processing element and the second processing element, and operative to manage data entering the first ring;

a bus;

an interface device connected between the control element and the bus;

a second plurality of adaptive computing elements connected in a second ring configuration, including a plurality of second processing elements connected in a chain configuration and including a third processing element at a first end of the chain and a fourth proceseing element at a second end of the chain, and a second control element connected to the first processing element and the second processing element, and operative to manage data entering the second ring;

a first data path connected the first processing element and the fourth processing element; and a second data path connected between the second processing element and the third processing element.

* * * * *